Feb. 8, 1944.    A. RAPPL    2,341,478
WINDOW OPERATOR
Filed Aug. 14, 1941    3 Sheets-Sheet 1

INVENTOR
ANTON RAPPL,
BY
Beau, Brooks, Buckley & Beau.
ATTORNEYS

Feb. 8, 1944.  A. RAPPL  2,341,478
WINDOW OPERATOR
Filed Aug. 14, 1941  3 Sheets-Sheet 2
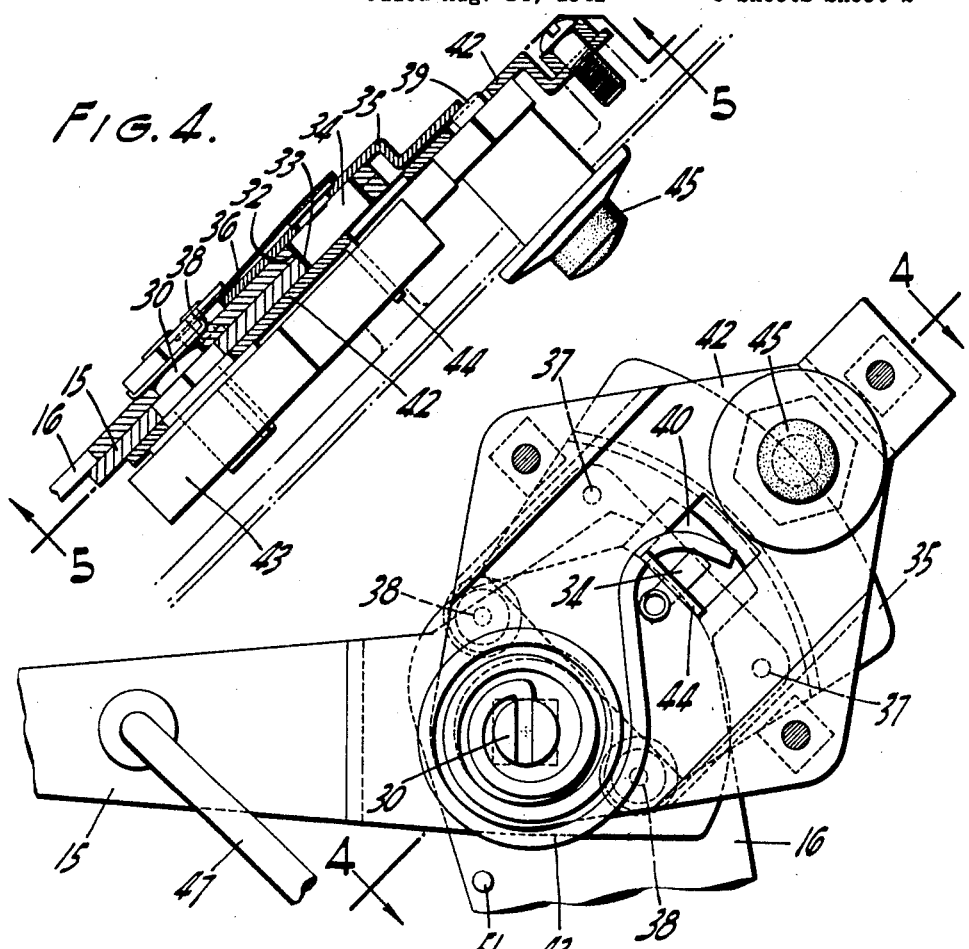
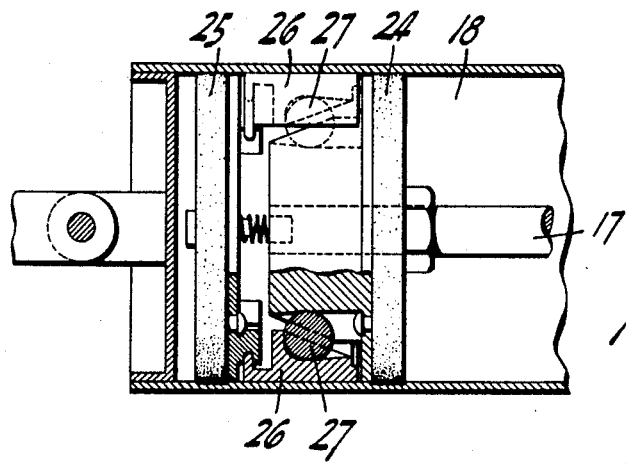
INVENTOR
ANTON RAPPL
BY
Bean, Brooks, Buckley & Bean
ATTORNEYS Feb. 8, 1944.  A. RAPPL  2,341,478
WINDOW OPERATOR
Filed Aug. 14, 1941  3 Sheets-Sheet 3
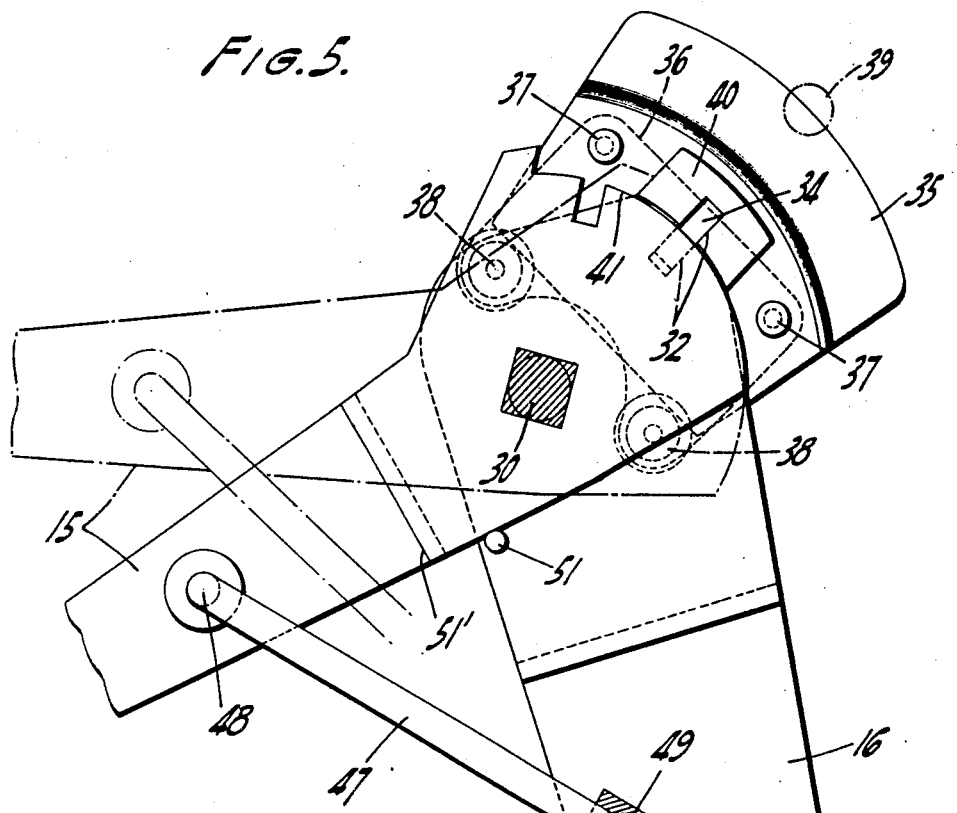
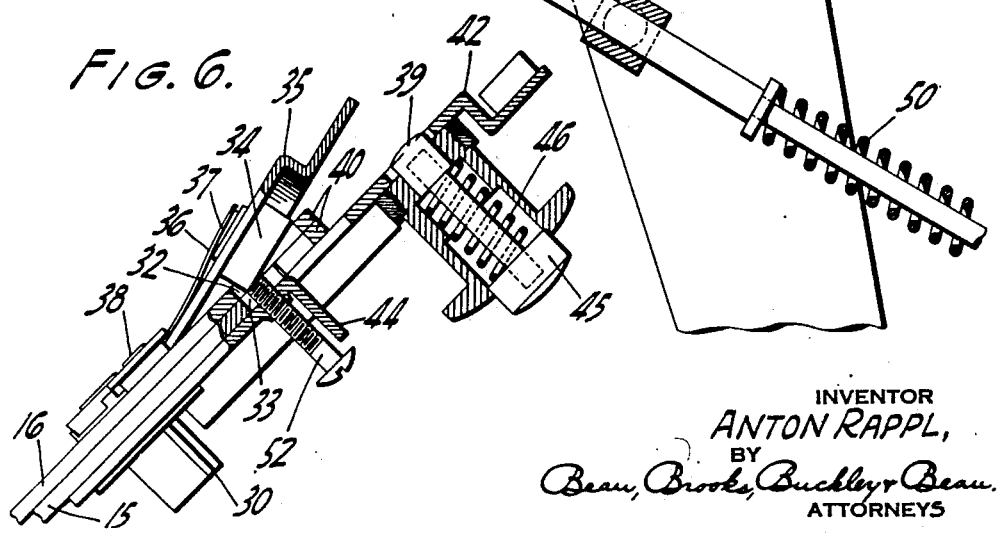
INVENTOR
ANTON RAPPL,
BY
Beau, Brooks, Buckley & Beau.
ATTORNEYS Patented Feb. 8, 1944

2,341,478

UNITED STATES PATENT OFFICE 2,341,478

WINDOW OPERATOR

Anton Rappl, Buffalo, N. Y., assignor to Trico Products Corporation, Buffalo, N. Y.

Application August 14, 1941, Serial No. 406,823

15 Claims. (Cl. 268—125)

This invention relates to a closure operating mechanism primarily designed for the regulation of automobile windows and it has for its primary object to provide mechanism which may easily be installed and which in operation will be practical and efficient.

The invention further has for its aim to provide a novel mechanism for raising and lowering the vertically slidable glass panel of an automobile window in a manner to avoid binding of the panel in its movement, and further to provide a construction which will facilitate the guidance and support of the panel during its opening and closing movements.

In the drawings

Fig. 2 is a fragmentary sectional view through the fluid motor drive which may be used for the mechanism;

Fig. 3 is an enlarged fragmentary elevation of a portion of the lifting mechanism;

Fig. 4 is a sectional view taken about on line 4—4 of Fig. 3;

Fig. 5 is a transverse sectional view taken about on line 5—5 of Fig. 4; and

Fig. 6 is a view similar to Fig. 4 during the step of installing the mechanism on a car door.

Figure 1:
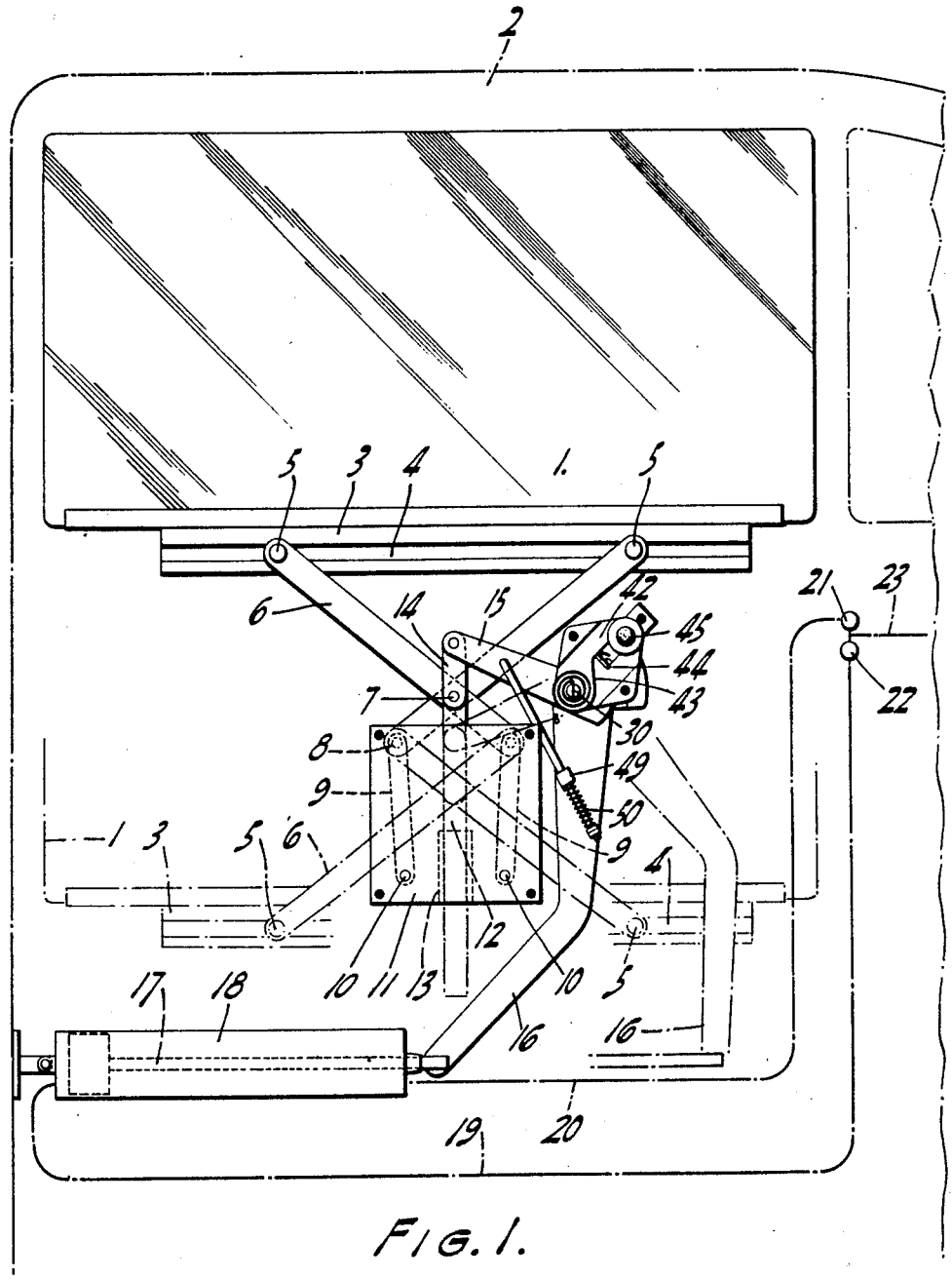
Fig. 1 is a phantom view of an automobile in fragment showing a window operating mechanism embodying the present invention.

Referring more particularly to the accompanying drawings, the numeral 1 designates a window panel vertically slidable into and out of the window well of the door 2 of an automobile, the panel carrying on its lower edge a bracket 3 which is formed with a groove or track 4 to operatively receive the guide pins 5 on the free ends of a pair of cross levers 6. The levers are connected intermediate their ends by a pivot pin 7 and their opposite ends are joined by pivots 8 to a pair of fulcrum links 9, the latter being pivotally supported at 10 on a mounting plate 11. This lazy tongs structure, as provided by the cross levers 6 and their floating support 9, is guided in its extending and contracting movements through a shoe 12 which depends from the cross pin 7 and is slidably engaged in a vertical guideway 13 on the mounting plate 11. Therefore, as the pin 7 is raised or lowered the guiding shoe or bar 12 will slide vertically in the guideway 13 and the cross levers 6 will correspondingly move from one side to the other of the plane of the pivots 8 which connect the shorter arms of the cross levers 6 to the links 9, as illustrated by the full and broken line showings in Fig. 1.

A link 14 suspends the pin 7 from an arm 15 of a bell crank lever, the companion arm 16 of the bell crank being connected to a suitable source of power, such as the fluid motor which has a piston rod 17 sliding into the cylinder 18. The motor is normally connected by conduits 19 and 20 through control valves 21 and 22 to a supply line 23, which in turn communicates with a source of fluid pressure, for example the intake manifold of a motor vehicle engine. When either control valve is actuated to interrupt the normal suction communication the corresponding end of the cylinder will be opened to the atmosphere to create a pressure differential on the piston for rocking the bell crank and accordingly adjusting the window. In the particular motor illustrated, the piston embodies a self-locking arrangement and comprises a fixed section 24 and a relatively movable or floating section 25 connected to each other by clutch shoes 26 and cooperating rollers 27. These rollers operate between opposed cooperating cam surfaces 28 and 29 on the fixed section 24 and the shoes 26, respectively, and serve to expand the clutch or locking shoes against the inner wall of the cylinder when any attempt is made to pry the window open, such prying force being transmitted by the piston rod 17 to the relatively fixed piston section 24. However, fluid operation of the piston will be permitted in a manner more fully disclosed in an application filed by me jointly with Erwin C. Horton on July 27, 1940, under Serial No. 347,941.

The transmission between the motor and the window incorporates means for freeing the window from the motor when it becomes necessary to open the window in an emergency or for any other reason, such as when the source of fluid pressure has failed. To this end the bell crank arms 15 and 16 are detachably locked together, as shown more fully in Figs. 3 through 6, wherein the motor window lifting arm 15 is fixed on a non-circular part of the shaft 30 while the motor arm 16 is freely pivoted on a circular part thereof. The two arms are extended to overlie each other and such overlying portions are formed with registrable recesses 32 and 33 which are adapted when registered with each other to receive a latch member 34 carried by a plate 35. The latch is pressed into its operative position by a spring leaf or plate 36 which also forms a hinged mounting for the latch carrying plate 35 being connected thereto by a pair of rivets 37 and connected to the motor arm by suitable fasteners 38. This construction permits a rugged latch structure with a greater resiliency for ease of manufacture and more efficiency in operation.

The outer margin of the latch plate 35 overrides a spring-retracted button or pin 39 which when depressed will withdraw the latch 34 from the recess 33 and thereby disengage the two arms for independent movement. The spring plate bears on or is connected by the fasteners 38 to a point between the inner and outer margins of the latch plate which permits the latter to fulcrum on an adjacent arm as it is tilted or rocked upon depression of the button 39. To provide substantial support for the latch pin in its engaged position the motor arm 16 is provided with a keeper part 40 overhanging the concentric margin 41 of the window lifting arm, as shown more particularly in Fig. 5. The shaft 30 as well as the disconnect button 39 are mounted on a bracket plate 42, the shaft being journaled therein and extended to receive interlockingly one end of a convolute counterbalancing spring 43. The opposite end of the spring is anchored on a suitable stop or rest 44 and therefore the action of the spring is tending to rotate the shaft and thereby to lift on the window connected arm 15 in counterbalance of the weight of the window panel. When it becomes necessary to manually open the window for emergency purposes, the button is depressed against the action of a spring 46 to lift the plate 35 and remove the latch from recess 33. At this time a secondary motor will function to rock the window connected arm 15 slightly for lowering the upper edge of a window a sufficient distance to enable the hand's being inserted and engaged over the upper edge for pulling the window to a more fully opened position. This auxiliary motor arrangement is illustrated as consisting of a rod 47 pivotally mounted at 48 on the arm 15 and slidably connected to the arm 16 by a swivel 49. A coil spring 50 encircling the protruding end of the rod 47 is adapted to be held compressed against the end of the swivel fitting 49 when the latch 34 is operative. Consequently the auxiliary spring motor 50 is normally held under compression ready to function immediately upon the uncoupling of the two arms 15 and 16. This disconnect feature is broadly disclosed in an application filed earlier by me jointly with Erwin C. Horton, Serial No. 364,421. A stop pin 51 may be mounted on the arm 15 to limit the extent of manual lowering of the window and thereby prevent the window's being lowered wholly into the window receiving well of the door 2, this being a precautionary measure against moving the window to such an extreme lowered position as to make it difficult to grasp the upper edge of the window again for manually lifting the window when occasion demands. In lieu of the pin 51, the arm 15 may be formed with an offsetting shoulder 51'. Or both stop means may be utilized simultaneously.

Means are provided to facilitate the mounting of the window operating mechanism just described on the door, such means being herein illustrated in the form of a set screw 52 which is threaded through the bracket 42 from within and adapted to enter the recess 33 for displacing the latch therefrom. The set screw holds the plate 42 from being turned about the shaft 30 by reason of the tendency of the convolute spring to unwind when the bracket plate 42 is demounted. It also permits the two arms to be moved relative to each other for attachment. Obviously, the set screw will be accessible before the upholstery is placed upon the door in order to remove the set screw after mounting the bell crank lever with the spring properly tensioned, whereupon the latter will function normally.

From the foregoing it will be noted that the toggle action in the window adjusting mechanism is steadied and guided by the shoe 12 sliding in the guideway and consequently the bell crank imparted movement as well as that imparted by the emergency motor are transmitted in a manner to insure even window motion free of any binding tendency. Furthermore, the window is precluded from dropping into the well beyond the reach of the hand. The sturdy mounting for the latch enables a relatively light spring being incorporated without detracting from its ruggedness and efficiency. Replacement or initial installation also is facilitated by the spring relieving set screw which enables the main motor and the window panel to be readily connected up to the transmission. While the mechanism has been illustrated and described in connection with the windows of automobiles, it is intended that the term window as used herein shall be comprehensive of doors and like closures.

While the foregoing description has been given in detail, it is obvious that the inventive concept herein expressed is capable of assuming other physical embodiments without departing from the spirit and scope of the appended claims.

What is claimed is:

1. Closure operating mechanism comprising a closure actuating arm, a power arm, the two arms mounted for movement about a common axis and having overlapping parts, said overlapping parts having registering recesses, a latch member normally but detachably engaging in the registering recesses to lock the arms into a unit, a latch carrying plate, a spring plate anchored on one arm and overlying the latch carrying plate intermediate its ends whereby one end of the latter may fulcrum on said one arm to lift the latch to an inoperative position, and means for causing the plate to so fulcrum.

2. Closure operating mechanism comprising a closure actuating arm, a power arm, the two arms mounted for movement about a common axis and having overlapping parts, said overlapping parts having registering recesses, a latch member normally but detachably engaging in the registering recesses to lock the arms into a unit, a latch carrying plate, a spring plate anchored on one arm and overlying the latch carrying plate intermediate its ends whereby one end of the latter may fulcrum on said one arm to lift the latch to an inoperative position, a mounting member carrying the arms, a counterbalance spring connecting said one arm to the mounting member under tension, and means operable to render the latch inoperative and to lock said one arm to the mounting member against relative movement by the counterbalance spring.

3. Closure operating mechanism comprising a closure actuating arm, a power arm, the two arms mounted for movement about a common axis and having overlapping parts, said overlapping parts having registering recesses, a latch member normally but detachably engaging in the registering recesses to lock the arms into a unit, a latch carrying plate, a spring plate anchored on one arm and overlying the latch carrying plate intermediate its ends whereby one end of the latter may fulcrum on said one arm to lift the latch to an inoperative position, said latch carrying plate having an arcuate engaging portion concentric with the axis, and a button member depressible to engage the arcuate portion to so fulcrum the latch carrying plate.

4. Closure operating mechanism comprising a closure actuating arm, a power arm, the two arms mounted for movement about a common axis and having overlapping parts, said overlapping parts having registering recesses, a latch member normally but detachably engaging in the registering recesses to lock the arms into a unit, a spring plate anchored on one arm and having a part overlying the recesses to carry the latch member, and means for springing the plate to disengage the latch member from connecting both arms.

5. Closure operating mechanism comprising a closure actuating arm, a power arm, the two arms mounted for movement about a common axis and having overlapping parts, said overlapping parts having registering recesses, a latch member normally but detachably engaging in the registering recesses to lock the arms into a unit, a spring plate anchored on one arm and having a part overlying the recesses to carry the latch member, the latch carrying part having a marginal ledge joined by an offsetting shoulder overlying the overlapping parts of the arms, and means engageable with the marginal ledge for springing the plate to render the latch member inoperative.

6. Closure operating mechanism comprising a clasure actuating arm, a power arm, the two arms mounted for movement about a common axis, one of said arms having a recess therein, a latch member engageable in the recess, a spring plate anchored on the companion arm and supporting the latch member for detachably engaging in the recess, and means for flexing the spring plate to disengage the latch member from the recess.

7. Closure operating mechanism comprising a closure actuating arm, a power arm, the two arms mounted for movement about a common axis, one of said arms having a recess, a latch member, a latch carrying plate supporting the latch member for detachable engagement in the recess, a spring plate anchored on the companion arm and overlying the latch carrying plate intermediate its ends whereby one end of the latter may fulcrum on said companion arm to lift the latch to an inoperative position, and means for causing the carrying plate to so fulcrum.

8. Closure operating mechanism comprising a closure actuating arm, a power arm, the two arms mounted for movement about a common axis, one of said arms having a recess, a latch member, a latch carrying plate supporting the latch member for detachable engagement in the recess, a spring plate anchored on the companion arm and overlying the latch carrying plate, the spring plate being anchored to said companion arm at points on opposite sides of the mounting axis for the arms whereby to give support to the spring plate, and means for lifting the carrying plate to disengage the latch member from the recess.

9. Closure operating mechanism comprising a closure actuating arm, a power arm, the two arms mounted for movement about a common axis, one of said arms having a recess, a latch member detachably engaging in the recess, a spring plate anchored on the companion arm at points on opposite sides of the common axis to give support to the spring plate, the latter carrying the latch member, and means for flexing the spring plate to disengage the latch member from the recess.

10. Closure operating mechanism comprising a closure actuating arm, a power arm, the two arms mounted for movement about a common axis and having overlapping parts, one of said overlapping parts having increased thickness beyond the companion overlapping part to overhang the margin of the latter, said overlapping parts having registering recesses, the recess of said one overlapping part extending into the increased thickness thereof, a latch member detachably engaging in the registering recesses to lock the arms as a unit, means supporting the latch member on one arm for detachably engaging in the recess of the other arm, and means for actuating said supporting means to so disengage the latch member.

11. Closure operating mechanism comprising a closure actuating arm, a power arm, the two arms mounted for movement about a common axis, a latch member normally but detachably acting to lock the arms into a unit, a latch carrying member carried on one arm and operable to lift the latch to an inoperative position, a mounting member carrying the arms, a counterbalance spring connecting said one arm to the mounting member under tension, and means operable to render the latch inoperative and to lock said one arm to the mounting member against relative movement by the counterbalance spring whereby to hold said one arm against movement on the mounting member by the counterbalance spring when mounting or demounting the mounting member.

12. Closure operating mechanism comprising, in combination with a closure slidably mounted for movement to and from a fully opened position wherein the closure is wholly received within a well in a wall, a pivoted actuating arm, a pivoted power arm mounted coaxially with the actuating arm for relative movement, the actuating arm operatively connected to the closure and having a full stroke for moving the same from a fully closed position to a fully opened position, means detachably coupling the two arms for movement as a unit, means operable to drive the power arm for imparting a full stroke to the actuating arm, means for imparting closure opening movement to the actuating arm alone when uncoupled from the power arm whereby the closure may be opened independently of the drive means and power arm, and means for determining the independent opening movement of the actuating arm short of the full stroke and thereby support the closure against being wholly received within the well to facilitate the manual grasping of the closure for manual movement.

13. A closure operating mechanism for sliding a closure to and from a fully opened position in which position the closure is wholly received within a well in a wall, said mechanism comprising a closure actuating arm, a power arm, means mounting the two arms for relative movement, means detachably coupling the two arms for movement as a unit, power means operatively connected to the power arm for imparting a full stroke to the actuating arm for so moving a connected closure wholly into the well, means operable to hold the power means and the power arm against closure imparted movement, normally inoperative auxiliary means operable to impart a shorter closure opening stroke to the actuating arm alone when the latter is uncoupled from the power arm and independently of the power means and the power arm whereby to position the closure from its seat a distance sufficient to enable the hand being inserted in the intervening space for grasping the closure to manually effect opening and closing movement of the actuator arm alone, and means cooperating with the actuator arm when the latter is uncoupled from the power arm for determining the extent of the closure opening movement of the actuator arm short of the full stroke extent and thereby support the connected closure from fully entering the well beyond manual reach.

14. Closure operating mechanism comprising, in combination with a closure slidably mounted for movement to and from a fully opened position wherein the closure is wholly received within a well in a wall, a fluid motor drive for the closure having a piston, a transmission operatively connecting the piston to the closure for movement back and forth as a unit, a closure actuated lock operable upon a closure imparted movement of the unit for locking the closure against movement, manually controlled means operable to release the closure by freeing the latter from the effectiveness of the lock whereby the closure may be manually opened, normally idle means operable upon the freeing of the closure for imparting an opening movement to the latter thereby to dispose the closure accessible for being manually grasped, and means for determining the manual opening movement of the closure short of its fully opened position and thereby support the closure against being wholly received within the well, to facilitate the manual grasping of the closure for such manual movement.

15. In a window regulator and particularly a power operated regulator, the combination of a window regulator mechanism operable to move the window from a fully closed position to a fully opened position wherein the window is wholly received within a well in a wall, said mechanism including the parts at the load end of the mechanism and the parts at the power end of the mechanism, a clutch operating to be released by the operation of the power parts of the regulator mechanism to lock the window in position, a releasable connection normally acting to render the clutch effective on the window and manually operable for freeing the window to permit movement of the window in an emergency although the clutch is locked, normally idle means operable upon the freeing of the window for imparting an opening movement to the latter thereby to dispose the window accessible for being manually grasped and operated, and means for determining the extent of manual opening movement of the window short of its fully opened position and thereby support the window against being wholly received within the well, to facilitate the manual grasping of the window for such manual movement.

ANTON RAPPL.